US012794983B2

(12) United States Patent
Kattepur et al.

(10) Patent No.: US 12,794,983 B2
(45) Date of Patent: Nov. 10, 2026

(54) ADJUSTING A NETWORK OF SENSOR DEVICES

(71) Applicant: Telefonaktiebolaget LM Ericsson (publ), Stockholm (SE)

(72) Inventors: Ajay Kattepur, Bangalore (IN); Ramamurthy Badrinath, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/035,959

(22) PCT Filed: Jul. 7, 2021

(86) PCT No.: PCT/IN2021/050657
§ 371 (c)(1),
(2) Date: May 9, 2023

(87) PCT Pub. No.: WO2022/101925
PCT Pub. Date: May 19, 2022

(65) Prior Publication Data

US 2023/0412682 A1 Dec. 21, 2023

(30) Foreign Application Priority Data

Nov. 11, 2020 (IN) ............................ 202041049208

(51) Int. Cl.
*H04L 67/125* (2022.01)
*H04L 41/5009* (2022.01)

(52) U.S. Cl.
CPC ........ *H04L 67/125* (2013.01); *H04L 41/5009* (2013.01)

(58) Field of Classification Search
CPC ... H04L 67/12; H04L 67/1097; H04L 1/0002; H04L 1/0041; H04L 1/18; H04L 5/0064;
(Continued)

(56) References Cited

U.S. PATENT DOCUMENTS

2010/0017870 A1* 1/2010 Kargupta ............ H04L 63/1408 709/201
2016/0197800 A1* 7/2016 Hui ....................... H04L 43/062 370/252
(Continued)

FOREIGN PATENT DOCUMENTS

EP 2668768 B1 3/2018

OTHER PUBLICATIONS

International Search Report and Written Opinion of the International Searching Authority for PCT International Application No. PCT/IN2021/050657 dated Oct. 4, 2021.
(Continued)

*Primary Examiner* — Djenane M Bayard
(74) *Attorney, Agent, or Firm* — Sage Patent Group

(57) ABSTRACT

It is provided a method for adjusting a network of sensor devices. The network also comprises an aggregation node for aggregating sensor data from at least two of the sensor devices to processed data and an application node configured to approach an application goal based on the processed data. The method is performed in a network device. The method comprises repeatedly performing the steps of: receiving an evaluation of performance of the application node in relation to the application goal; determining that the evaluation indicates that an adjustment is needed; responsive to determining that an adjustment is needed, determining an operation adjustment of at least one of the aggregation node and the sensor devices; and triggering the adjustment.

18 Claims, 5 Drawing Sheets

(58) Field of Classification Search
CPC ... H04L 67/306; H04L 1/0009; H04L 1/1874; H04L 67/10; H04L 12/66; H04L 43/045; H04L 47/122; H04L 67/125; H04L 69/00; H04L 1/0057; H04L 1/0076; H04L 1/1854; H04L 67/565; H04L 69/163; H04L 69/164; H04L 1/004; H04L 41/145; H04L 63/1408; H04L 67/56; H04L 41/16; H04L 12/282; H04L 41/0886; H04L 41/22; H04L 63/0227; H04L 63/123; H04L 9/50; H04L 12/2801; H04L 12/2816; H04L 41/0823; H04L 41/0895; H04L 43/0811; H04L 43/0817; H04L 43/091; H04L 63/105; H04L 67/54; H04L 1/242; H04L 41/046; H04L 41/0668; H04L 41/0803; H04L 41/0806; H04L 41/0816; H04L 41/0893; H04L 41/0894; H04L 41/12; H04L 41/40; H04L 43/02; H04L 43/026; H04L 43/04; H04L 43/062; H04L 43/08; H04L 43/0805; H04L 43/0829; H04L 43/0841; H04L 43/0858; H04L 43/0864; H04L 43/0876; H04L 43/0882; H04L 43/0888; H04L 43/10; H04L 12/14; H04L 12/2803; H04L 63/1458; H04L 63/20; H04L 63/1425; H04L 2463/144; H04L 47/22; H04L 47/621; H04L 63/0869; H04L 63/1491; H04L 63/166; H04L 41/0853; H04L 41/147; H04L 41/5009; H04L 45/48; H04L 63/0823; H04L 63/107; H04L 63/1416; H04L 63/1441; H04L 67/75; H04L 43/16; H04L 63/1433; H04L 63/145; H04L 9/3239; H04L 2209/34; H04L 2209/80; H04L 2209/84; H04L 2209/88; H04L 9/0841; H04L 9/3215; H04L 9/3226; H04L 9/3271; H04L 65/4015; H04L 65/403; H04L 9/0631; H04L 9/3278; H04L 2463/121; H04L 63/02; H04L 63/0428; H04L 63/0442; H04L 63/061; H04L 63/0807; H04L 63/0815; H04L 63/12; H04L 67/535; H04L 9/0643; H04L 9/0894; H04L 9/14; H04L 9/3236; H04L 51/02; H04L 12/1895; H04L 67/04; H04L 9/0866; H04L 63/0861; H04L 12/2814; H04L 2463/082; H04L 67/562; H04L 67/566; H04L 9/0822; H04L 9/0838; H04L 9/0877; H04L 9/12; H04L 9/3231; H04L 1/16; H04L 1/1867; H04L 2209/56; H04L 27/0014; H04L 41/084; H04L 41/142; H04L 41/149; H04L 43/024; H04L 5/0008; H04L 63/083; H04L 63/0876; H04L 67/025; H04L 67/55; H04W 12/50; H04W 12/03; H04W 12/06; H04W 12/08; H04W 4/021; H04W 4/024; H04W 4/38; H04W 84/18; H04W 12/02; H04W 12/47; H04W 12/67; H04W 4/80; H04W 88/02

See application file for complete search history.

(56) References Cited

U.S. PATENT DOCUMENTS

| | | | | |
|---|---|---|---|---|
| 2018/0006888 | A1* | 1/2018 | Vaughn | H04L 41/0813 |
| 2019/0377305 | A1* | 12/2019 | Petrus | G05B 15/02 |
| 2020/0296186 | A1* | 9/2020 | Lau | G06N 20/00 |
| 2022/0327204 | A1* | 10/2022 | Abbaszadeh | G06F 21/552 |

OTHER PUBLICATIONS

Psaier et al., "A survey on self-healing systems: approaches and systems," Computing, Springer, Aug. 2011, 32 pages.

Kühn et al., "A Model-based Approach for Self-healing IoT Systems," Position Paper, Proceedings of the 7th International Conference on Sensor Networks (Sensornets 2018), 2018, pp. 135-140.

Castanedo et al., "A Multi-agent Architecture Based on the BDI Model for Data Fusion in Visual Sensor Networks," Journal of Intelligent & Robotic Systems, Jun. 2011, 34 pages.

Sun et al., "A Multi-Agent-Based Intelligent Sensor and Actuator Network Design for Smart House and Home Automation," Journal of Sensor and Actuator Networks, 2013, pp. 557-588.

Nguyen et al., "A Self-healing Framework for Online Sensor Data," Conference Paper, Jul. 2015, 7 pages.

Dastani et al., "Programming Agent Deliberation—An Approach Illustrated Using the 3APL Language," AAMAS'03, Jul. 14-18, 2003, Melbourne, Australia, 9 pages.

Tošić et al., "On the Programming Models, Smart Middleware and Self-Healing Capabilities for the Next-Generation Internet-of-Things," Proceedings of the 2018 Computing Conference, vol. 1, London, UK, 9 pages.

Benaskeur et al.; "Adaptive data fusion and sensor management for military applications"; Aerospace Science and Technology, vol. 11, No. 4; May 3, 2007, XP022059641, 12 pages.

Extended European Search Report mailed Aug. 27, 2024 for European Patent Application No. 21891377.0, 9 pages.

* cited by examiner

ADJUSTING A NETWORK OF SENSOR DEVICES

CROSS-REFERENCE TO RELATED APPLICATIONS

This application is a 35 U.S.C. § 371 national stage application of PCT International Application No. PCT/IN2021/050657 filed Jul. 7, 2021, which claims the benefit of Indian Patent Application number 202041049208, filed on Nov. 11, 2020, the disclosures and content of which are incorporated by reference herein in their entireties.

TECHNICAL FIELD

The present disclosure relates to the field of a network of sensor devices, an aggregation node and an application node, and in particular to adjusting operation of the sensor devices and/or the aggregation node to approach an application goal.

BACKGROUND

Intelligent systems are based on a network of multiple sensors and inferring an output based on the sensors. The sensors can be physical sensor or sensors from data sources. However, sensor performance changes over time, whereby the network needs to be adjusted, also known as self-healing when this can be performed autonomously based on performance data.

T. A. Nguyen, et al "A Self-Healing Framework for Online Sensor Data," Autonomic Computing (ICAC), 2015 IEEE International Conference on Automatic Computing, Grenoble, 2015, pp. 295-300, discloses wireless sensor networks (WSNs) collecting reliable and accurate context information so that applications are able to provide services to users on demand. In such environments, sensors should be self-adaptive by taking correct decisions based on sensed data in realtime. However, sensor data is often faulty. Faults are not so exceptional and, in most deployments, tend to occur frequently. Therefore, the capability of self-healing is important to ensure higher levels of reliability and availability. It is there disclosed a framework which provides self-healing capabilities.

Self-healing is an important aspect of deliberation and cognition in intelligent systems. Systems today and tomorrow will make use of multiple datasets, dynamic sensing rates and actuation capabilities. A self-healing solution should be able to detect both hardware and software changes when this results in deteriorating knowledge (and consequently inferences) in the system and dynamically adjust the network in response.

SUMMARY

One object is to improve adjustments of sensor devices and/or aggregation nodes where data from multiple sensors are used in an application, in order to approach an application goal.

According to a first aspect, it is provided a method for adjusting a network of sensor devices. The network also comprises an aggregation node for aggregating sensor data from at least two of the sensor devices to processed data and an application node configured to approach an application goal based on the processed data. The method is performed in a network device. The method comprises repeatedly performing the steps of: receiving an evaluation of performance of the application node in relation to the application goal; determining that the evaluation indicates that an adjustment is needed; determining an operation adjustment of at least one of the aggregation node and the sensor devices; and triggering the adjustment.

The step of determining an operation adjustment may comprise determining an adjustment of a processing function of the aggregation node, wherein the processing function combines sensor data from at least two of the sensor devices to processed data.

The step of determining an operation adjustment may comprise determining an adjustment action to adjust how at least one sensor device provides sensor data.

The step of determining an operation adjustment may be performed using a machine learning engine.

The method may further comprise the step of: obtaining updated processed data; wherein the step of determining an operation adjustment is based at least partly on the updated processed data.

The method may be performed in an agent module executing in the network device, the agent module forming part of a multi-agent programming framework.

The method may further comprise the step of: transmitting the updated processed data to another agent module.

The agent modules may be arranged hierarchically.

The sensor devices may be internet-of-things, IoT, sensors.

The sensor devices may be telecommunication network sensors.

According to a second aspect, it is provided a network device for adjusting a network of sensor devices, the network also comprising an aggregation node for aggregating sensor data from at least two of the sensor devices to processed data and an application node configured to approach an application goal based on the processed data. The network device comprises: a processor; and a memory storing instructions that, when executed by the processor, cause the network device to repeatedly: receive an evaluation of performance of the application node in relation to the application goal; determine that the evaluation indicates that an adjustment is needed; determine an operation adjustment of at least one of the aggregation node and the sensor devices; and trigger the adjustment.

The instructions to determine an operation adjustment may comprise instructions that, when executed by the processor, cause the network device to determine an adjustment of a processing function of the aggregation node, wherein the processing function combines sensor data from at least two of the sensor devices to processed data.

The instructions to determine an operation adjustment may comprise instructions that, when executed by the processor, cause the network device to determine an adjustment action to adjust how at least one sensor device provides sensor data.

The network device may comprise a machine learning engine to determine the operation adjustment.

The network device may further comprise instructions that, when executed by the processor, cause the network device to: obtain updated processed data; and wherein the instructions to determine an operation adjustment is based at least partly on the updated processed data.

The network device may further comprise an agent module and wherein the instructions form part of the executing in the agent module, wherein the agent module forms part of a multi-agent programming framework.

The network device may further comprise instructions that, when executed by the processor, cause the network device to: transmit the updated processed data to another agent module.

The agent modules may be arranged hierarchically.

The sensor devices may be internet-of-things, IoT, sensors.

The sensor devices may be telecommunication network sensors.

According to a third aspect, it is provided a computer program for adjusting a network of sensor devices, the network also comprising an aggregation node for aggregating sensor data from at least two of the sensor devices to processed data and an application node configured to approach an application goal based on the processed data. The computer program comprises computer program code which, when executed on a network device causes the network device to: receive an evaluation of performance of the application node in relation to the application goal; determine that the evaluation indicates that an adjustment is needed; determine an operation adjustment of at least one of the aggregation node and the sensor devices; and trigger the adjustment.

According to a fourth aspect, it is provided a computer program product comprising a computer program according to the third aspect and a computer readable means on which the computer program is stored.

By performing this process in the network device, rather than within the application, the complex actuations are externalised from the application. All the network device has to act on is the knowledge state that affects the outcome to approach the goals. This acts as a cognitive reaction to the current knowledge base, automatically deriving plans and strategies to rectify deteriorating actuation conditions.

The embodiments performed in the network device are based on the knowledge and actuation goals of the application. The network device is agnostic to the techniques used by the application internally for computation/actuation. This clean separation of knowledge states and internal application allows for improved diagnosis of the cause of deterioration. Moreover, scalability is greatly improved by the separation of the application and the adjustment. Integrating the network device allows for dynamic reconciliation of knowledge deterioration and planning to improve knowledge gathering. Evaluating the actuation efficiency when decoupled from the environment allows for superior tuning of the sensor devices and knowledge processing, with environmental context.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
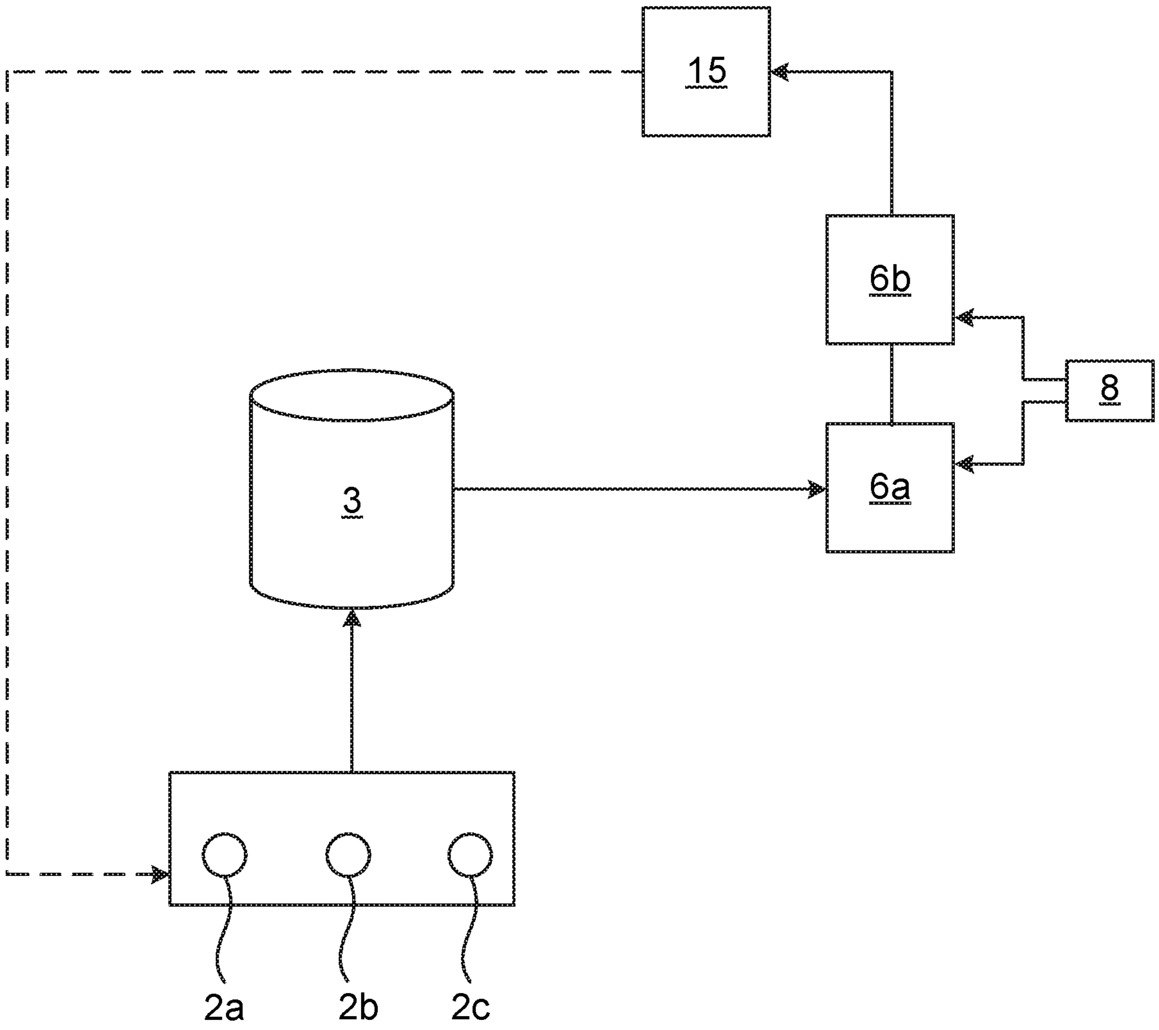
FIG. 1 is a schematic diagram illustrating an environment according to the prior art.

FIG. 1 is a schematic diagram illustrating an environment according to the prior art. The solid lines indicate a data flow and the dashed lines indicate a control flow.

A number of sensors 2_a-c_ provide raw sensor data to a sensor data storage 3. An application 6_a_ uses the sensor data to infer a result and potentially perform an action using an actuation node 6_b_. The application 6_a_ can e.g. be an IoT application.

A monitoring node 15 monitors performance of the IoT application. When needed, the monitoring node adjusts the operation of one or more of the sensors 2_a-c_.

Here, there is an assumption that the monitoring node 15 can provide information about the current state of the world, current knowledge efficacy, actuation feedback and parameter tuning. This is neither scalable, nor viable to have on one device.

Figure 2:
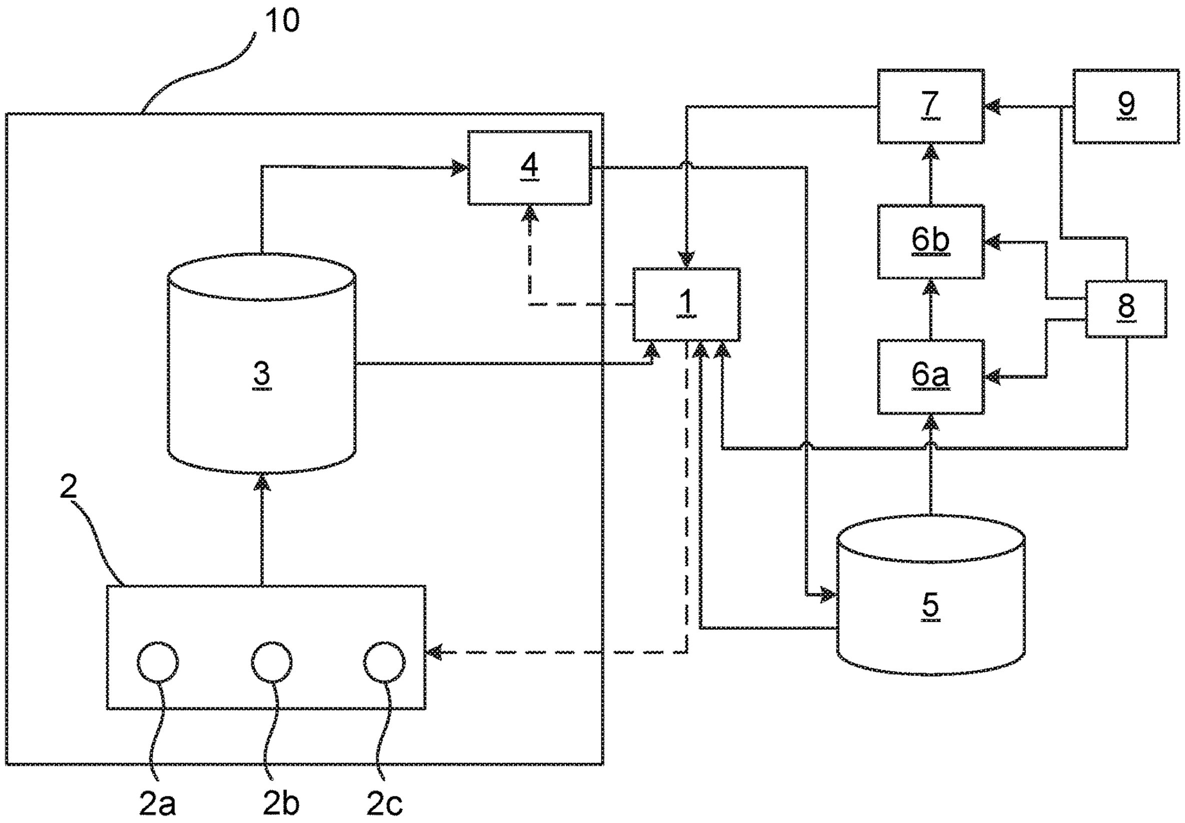
FIG. 2 is a schematic diagram illustrating an environment in which embodiments presented herein can be applied.

FIG. 2 is a schematic diagram illustrating an environment in which embodiments presented herein can be applied. The solid lines indicate a data flow and the dashed lines indicate a control flow.

One or more of the sensors 2_a-c_ can produce sensor data based on physical sensor, such as weather, light, sound, etc. Alternatively or additionally, one or more of the sensors 2_a-c_ can produce sensor data based on external data sources, such as weather sources, road condition sources, APIs (Application Programming Interfaces) provided by Google® e.g. for traffic, search traffic, or Twitter® (for tag or word/phrase prevalence). These sensors 2_a-c_ provide raw sensor data to a sensor data storage 3. It is to be noted that while three sensor devices 2_a-c_ are shown in FIG. 2, any number of sensor devices 2_a-c_ can be provided, as long as there are at least two sensor devices.

The sensor data from the sensor data storage 3 is here used by an aggregation node 4 for aggregating sensor data from at least two of the sensor devices 2_a-c_ into processed data, hereinafter also denoted knowledge state. This aggregation can be based on sensor fusion. One example of the aggregation is in the context of traffic prediction, where the application is used to estimate the traffic congestion of a particular location. In this case, data from multiple sensor devices may be used, including historical traffic data, camera feeds, weather information and local regulations. The data from multiple sensors are then fused using appropriate functions to derive the processed data. The aggregation node can be implemented in a programmable computer, e.g. a server or programmable field device.

The processed data output by the aggregation node 4 is stored in a knowledge base 5. The knowledge base 5 is implemented using any suitable database, provided in a single physical device or distributed over a plurality of physical devices.

An application 6*a* reads the processed data from the knowledge base 5 and infers a result, based on an application goal 8. An application actuator 6*b* can perform actions based on the result inferred from the application node 6*a*, as well as based on the application goal 8. Some non-limiting examples of application goals are: "switch off lights when no activity" or "divert traffic to ensure low road congestion". Such high-level goals can be given to a complex IoT application as they are, or the high-level goal can be divided into smaller goals for simplicity. Additional goal can be the level of QoS (Quality of Service), e.g. accuracy, latency, scale.

Physically, the application 6*a* and the application actuator 6*b* can be combined in a single computing device or spread over several computing devices. Such as one or more servers or other programmable computing devices.

An actuation evaluator 7 evaluates the efficacy on the actuation based on the application goal 8 and environment context 9, using an evaluation function Eval(d). This can involve receiving user input regarding positive or negative feedback on the result of the application. The environment context can include nuances of the deployment not included in the goals. For instance, in a highly dynamic environment (traffic, weather), any decisions taken are accurate when the data has been collected within a recent timeframe. This contextual information may not be known by the goal beforehand.

According to embodiments presented herein a network device 1 is provided that monitors the evaluation and adjusts either the sensor devices 2*a-c* or the aggregation node 4 based on the evaluation. As explained in further detail below, the adjustment to the sensor devices can e.g. be related to how often sensor data is collected or parameters used when collecting sensor data. The adjustment to the aggregation node 4 can e.g. include adjusted weights in the aggregation. Since the network device 1 is based on a feedback loop, the result of the adjustment will be evaluated, allowing the network device 1 to adapt its adjustment to approach the goal.

The network device 1 has information about one or more of the following:

- A set of device specific sensor actions {A}=(a1, a2 . . . ak). Some examples of sensor actions are: increase sensing rate, increase power, change angle, move computation to another processing unit/node.
- A set of data processing functions {F}=(f1, f2 . . . fn). Some examples of sensor actions are: increase correlation with other sources, and match with historical data.
- Optionally, a set of alternate sensor devices for alternate data sources, e.g. as a replacement or additional source to address a failed or deteriorated sensor device.
- Actuation actions (at the application level) that provides a feedback on the usage of the processed data in the knowledge base 5.
- The application goal 8

The network device 1 receives the evaluation of the result from the application actuation, based on the application Eval(d) and can perform any of a number of different steps. For instance, if information on further knowledge is needed, the network device 1 can evaluate the sensor device by directly obtaining data from the sensor data storage 3. Alternatively or additionally, the network device 1 can select from {A}, one or more actions to improve data from the sensor devices 2*a-c*. Alternatively or additionally, the network device 1 can select from {F}, one or more processing functions to aggregate data. Alternatively or additionally, the network device 1 can extract knowledge from the knowledge base 5, to thereby improve the knowledge data provided to the application 6*a*, as measured by the evaluation function Eval(d).

By performing this process in the network device 1, rather than within the application 6*a*, the complex actuations are externalised from the application. All the network device 1 has to act on is the knowledge state that affects the outcome to approach the goals. This acts as a cognitive reaction to the current knowledge base, automatically deriving plans and strategies to rectify deteriorating actuation conditions.

The network device 1 can be implemented using a multi-agent programming framework that allows deployment of multiple instances of the network device 1 across a plurality of different physical computers. The agents can observe a shared environment, communicate with one another, reason about their states, perform updates and act on the environment. The agents can be based on a Belief-Desire-Intention (BDI) software framework. This provides a structured framework for reasoning about the current state of knowledge (belief), the state of the world or goal state that the agent would like to achieve (desire) and the sequence of actions that are to be performed to achieve it (intention).

BDI agents have a belief knowledge base, capability list, goal creation and planning capabilities. These agents are deployed on the network to regularly update its knowledge (belief) to monitor the system. In case the state of the network is suboptimal, it can plan strategies for improvements, such as increasing sensing rate, putting sensors to sleep, allocate additional computational resources or execute inferencing mechanisms in the aggregation node.

Multiple agents can share information to estimate beliefs about the common knowledge base.

The different agents can be deployed with their own zones of monitoring and/or control. These agents may share beliefs or actions with neighbouring agents. A hierarchy of agents can also be used, with knowledge flowing from a local to a global level for a higher order of actions when an occurrence is experienced by a plurality of lower level agents.

In order to be scalable, the agents are deployed at appropriate locations physically and with an appropriate number of agents. In one embodiment, it is desired to minimise the number of agents, subject to an agent monitoring area being less than a first threshold, an agent healing capability being greater than a second threshold and a system knowledge update accuracy being greater than a third threshold. Agent monitoring area refers to the subset of sensor devices, datasets, and actuators that the particular agent monitors. This may be based on geographical location, hierarchy or the level of computational complexity that a particular agent may handle. This can be effectively sub-divided among multiple agents to allow for scalability. Agent healing capability refers to the actions that may be performed effectively, i.e. {A} and {F}, for a specific set of applications. Given a set of {A} and {F}. there is a threshold to which the agent can "heal" the information contained. System knowledge update accuracy refers to the close to ideal knowledge datasets that are available to the system. Cooperation between multiple agents (peer and/or hierarchy) can improve this threshold. Alternatively or additionally, the network device 1 can be implemented using a rule engine and/or a reinforcement learning which makes use of machine learning techniques.

An example will now be disclosed to illustrate the use of the different entities of FIG. 2 in an application 6*a* used to predict traffic congestion.

A first sensor 2*a* takes data from a Google® traffic API. A second sensor 2*b* obtains weather forecasts from an external source. A third sensor 2*c* scans local news bulletins provided on Internet servers to find news that affect traffic. Users of this application 6*a* may request traffic congestion prediction for a specific location. This application is based on near-realtime accurate knowledge of traffic conditions in the specific location.

The three sensors 2*a*-2*c* store their sensor data in the sensor data storage 3, which is aggregated (fused) to processed data stored in the knowledge base 5. Since there are a limited number of sensors, the data aggregator 4 can e.g. be used to interpolate and fuse data from the sensor devices (or relating to different locations) to provide processed data for a number of different locations. This allows traffic congestion knowledge to be provided at more locations than where there are sensor devices.

The application 6*a* infers predicted traffic congestion based on the processed data, and provides this prediction to users of the application 6*a*. The application actuator 6*b* can then perform actions such as marking a particular road red and divert traffic to alternate green road.

Each sensor data set from the sensors 2*a-c* has a limited validity time. The sensor data is frequently updated. Moreover, the sensor data from the different sensor devices 2*a-c* can show conflicting knowledge about traffic conditions in the location.

The application 6*a* that combines the processed data based on the sensor data should carry the caveat of such accuracy. The relationships that are inherent in the data models (e.g. rain causing increased traffic, road repairs diverting traffic) are integrated in the application.

A user can report when how the application performs, which is used by the actuation evaluator 7 and forwarded to the network device 1. When the evaluation is negative, the network device performs an operation adjustment, e.g. to silence a sensor device that provides consistently inaccurate data or to increase reporting frequency of a sensor device, to thereby improve performance of the application 6*a*.

Figure 3:
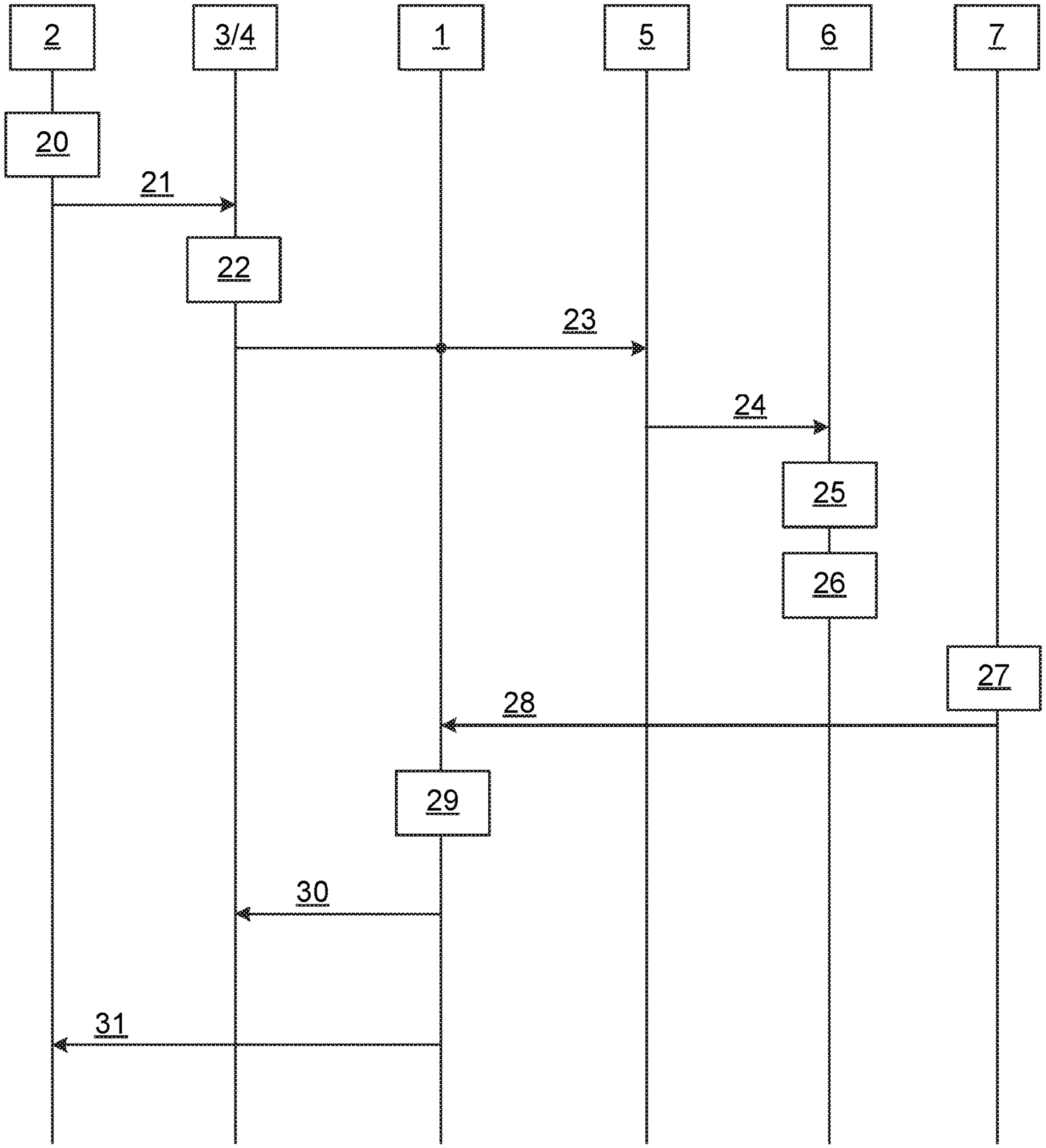
FIG. 3 is a sequence diagram illustrating communication between various entities of embodiments which can be applied in the environment of FIG. 2.

FIG. 3 is a sequence diagram illustrating communication between various entities of embodiments which can be applied in the environment of FIG. 2. This will illustrate the function of the network device 1 further.

The sensor devices 2 perform sensing 20 and provides raw data 21 to the sensor data storage 3.

The aggregation node 4 aggregates 22 sensor data from at least two of the sensor devices and provides the processed data (also known as knowledge state) 23 and stores this data in the knowledge base 5. Optionally, the network device 1 also obtains the processed data 23 at this stage, or later (not shown).

The application 6 (here comprising both the application 6*a* and the actuation node 6*b*) obtains the processed data from the knowledge base 5 to infer 25 a result and optionally perform 26 an action.

The actuation evaluator 7 evaluates 27 the performance of the application 6, i.e. a result of the application 6 and its actuation, and provides an evaluation result 28 to the network device 1.

The network device 1 optionally updates its knowledge state and determines one or more operation adjustments, which can result in an adjustment 30 of a processing function in the aggregator node 4 and/or an adjustment of how at least one sensor device provides sensor data.

The procedure then repeats, creating a feedback loop to allow the network device to further adjust is operation adjustments.

Figure 4A:
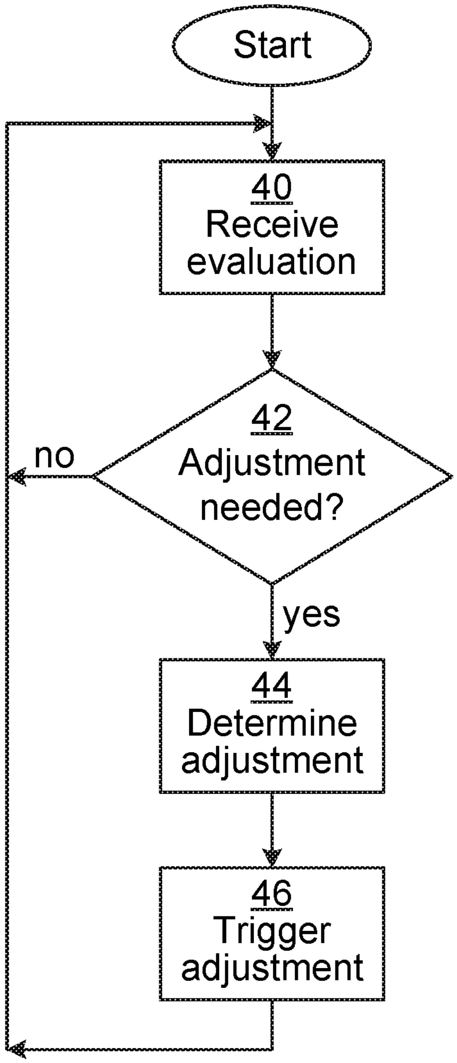
FIGS. 4A-B are flow charts illustrating embodiments of methods for adjusting a network of sensor devices.
Figure 4B:
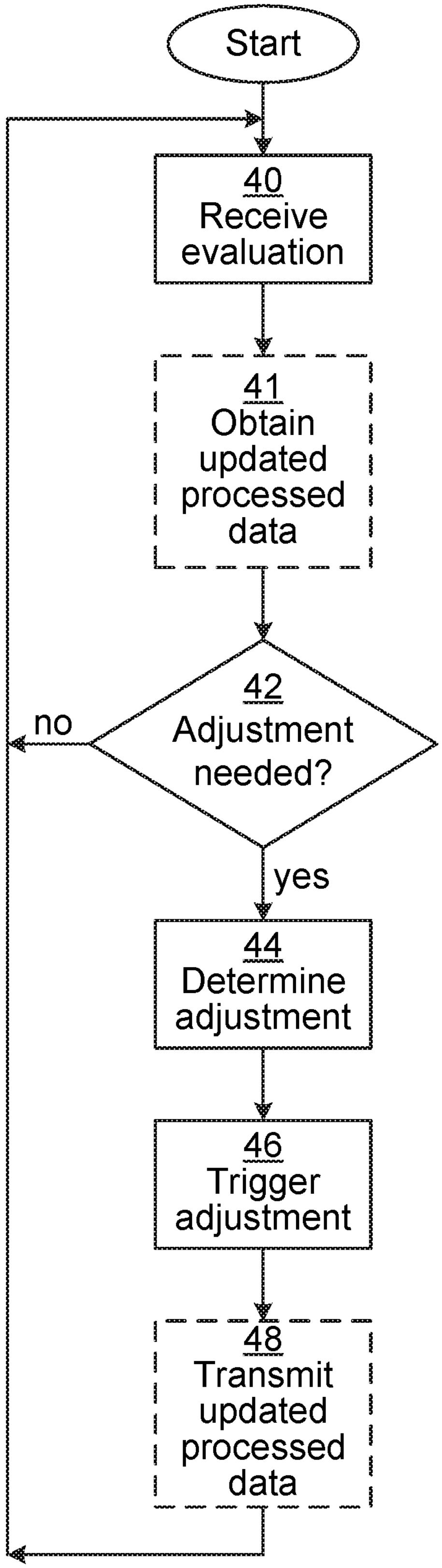

FIGS. 4A-B are flow charts illustrating embodiments of methods for adjusting a network 10 of sensor devices 2*a-c*. As shown in FIG. 2, the network 10 also comprises an aggregation node 4 for aggregating sensor data from at least two of the sensor devices 2*a-c* to processed data and an application node configured to approach an application goal based on the processed data.

The method can be performed in an agent module executing in the network device 1. The agent module can form part of a multi-agent programming framework, e.g. arranged hierarchically as described above.

The sensor devices 2*a-c* can e.g. be internet-of-things (IoT) sensors. Alternatively or additionally, the sensor devices 2*a-c* are telecommunication network sensors, conforming with a cellular communication specification, e.g. any one or more of 5G NR (New Radio), LTE (Long Term Evolution), LTE Advanced, W-CDMA (Wideband Code Division Multiplex), or any other current or future wireless network.

First embodiments related to the flow chart of FIG. 4A will be described.

In a receive evaluation step 40, the network device 1 receives an evaluation of performance of the application node 6*a* in relation to the application goal 8. This evaluation can be received from actuation evaluator 7.

In a conditional adjustment needed step 42, the network device 1 determines whether the evaluation indicates that an adjustment is needed to better match the application goal 8. For instance, is the performance outside an acceptable pre-defined or dynamically calculated range? If this is not the case, performance is acceptable and the method restarts. Otherwise, the method proceeds to a determine adjustment step 44.

In the determine adjustment step 44, the network device 1 determines an operation adjustment of at least one of the aggregation node 4 and the sensor devices 2*a-c*. In other words, the operation adjustment involves an adjustment to the operation of the aggregation node 4 and/or one or more of the sensor devices 2*a-c*.

In one embodiment, an adjustment of a processing function of the aggregation node 4 can be determined. As described above, the processing function combines sensor data from at least two of the sensor devices 2*a-c* to processed data.

In one embodiment, an adjustment action is determined to adjust how at least one sensor device 2*a-c* provides sensor data.

Optionally, the operation adjustment is stored to allow learning of operation adjustment over time, by comparing with subsequent evaluations of performance.

This step can be performed using a machine learning engine, such as a neural network. Alternatively or additionally, this step is based on rule-based processing.

Faults that occur can be of different types and result from hardware deterioration (faulty sensors, battery) or software faults (improper combination of datasets).

Intermittent faults that occur occasionally in a discrete fashion can e.g. be a malfunction, which results in frequent faulty readings that cross an acceptable threshold. Another type of intermittent fault is a random fault that occur randomly and the is not repeated often.

There can also be regular faults that are more consistent and may generate a pattern, such as a bias which is a negative or positive offset error that occurs consistently. Another type of regular fault is drifting, which can be considered to be a bias that progresses over time.

Malfunctions or random faults can be counteracted by voting among cooperating agents or by interpolating values between reading intervals. Model learning and statistical analysis can be used to counteract bias and drift faults.

Recovery to a healthy knowledge state is dependent on the performance of the network device and the type of application on which the actions are performed.

For realtime applications, knowledge deterioration may lead to increased sensing, increased edge computations or better network provision for computations to complete on time.

For non-realtime applications, knowledge deterioration may be counteracted by increasing sensor fusion/collaboration, invocation of more accurate algorithms or extending sensing time to improve performance.

Both realtime and non-realtime applications are here addressed at knowledge level, i.e. not at sensor device level. This allows the network device to query the network for information, update internal knowledge states and determine actions to reconfigure the system to desired belief accuracy state. In this way, the network device adds a layer of cognition on the entire network, allowing for reasoning about the knowledge and evaluating strategies for improvement.

In a trigger adjustment step 46, the network device 1 triggers the adjustment by actuating the determined adjustment in the aggregation node and/or one or more sensor devices.

Looking now to FIG. 4B, only new or modified steps compared to FIG. 4A will be described.

In an obtain updated processed data step 41, the network device 1 obtains updated processed data. When this step is performed, the determine adjustment step 44 comprises determining the operation adjustment based at least partly on the updated processed data.

In a transmit updated processed data step 48, the network device 1 transmits the updated processed data to another agent module.

The embodiments performed in the network device 1 are based on the knowledge and actuation goals of the application. The network device is agnostic to the techniques used by the application internally for computation/actuation. This clean separation of knowledge states and internal application allows for improved diagnosis of the cause of deterioration. Multiple application actuations may have differing outcomes for the same knowledge state, which can be addressed by further information sharing or knowledge updates. Moreover, scalability is greatly improved by the separation of the application and the adjustment. Integrating the network device allows for dynamic reconciliation of knowledge deterioration and planning to improve knowledge gathering. Evaluating the actuation efficiency when decoupled from the environment allows for superior tuning of the sensor devices and knowledge processing, with environmental context.

Figure 5:
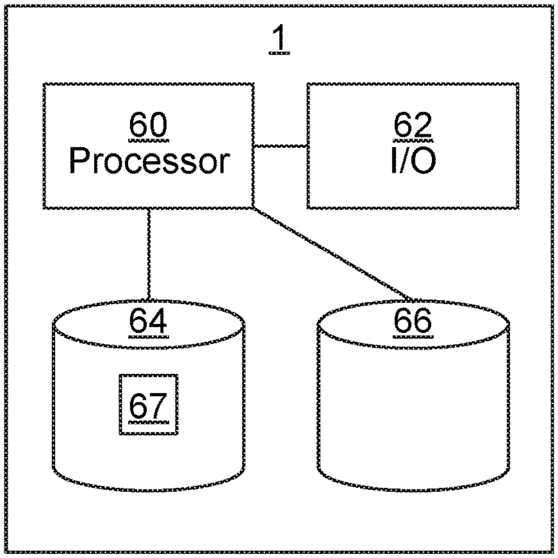
FIG. 5 is a schematic diagram illustrating components of the network device of FIG. 2 according to one embodiment.

FIG. 5 is a schematic diagram illustrating components of the network device 1 of FIG. 2 according to one embodiment. A processor 60 is provided using any combination of one or more of a suitable central processing unit (CPU), graphics processing unit (GPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIGS. 4A-B above.

The memory 64 can be any combination of random-access memory (RAM) and/or read-only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The network device 1 further comprises an I/O interface 62 for communicating with external and/or internal entities. Optionally, the I/O interface 62 also includes a user interface.

Other components of the network device 1 are omitted in order not to obscure the concepts presented herein.

The network device can support the execution of one or more agent modules. The agent module can then form part of a multi-agent programming framework.

Figure 6:
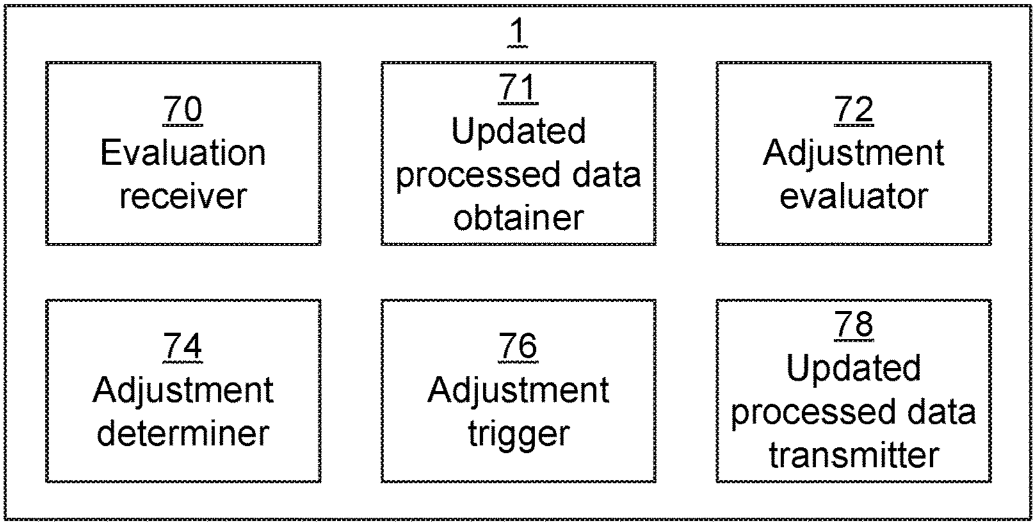
FIG. 6 is a schematic diagram showing functional modules of the network device of FIG. 2 according to one embodiment.

FIG. 6 is a schematic diagram showing functional modules of the network device 1 of FIG. 2 according to one embodiment. The modules are implemented using software instructions such as a computer program executing in the network device 1. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 4A-B.

An evaluation receiver 70 corresponds to step 40. An updated processed data obtainer 71 corresponds to step 41. An adjustment evaluator 72 corresponds to step 42. An adjustment determiner 74 corresponds to step 44. An adjustment trigger 76 corresponds to step 46. An updated processed data transmitter 78 corresponds to step 48.

Figure 7:
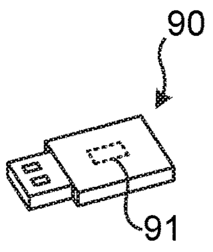
FIG. 7 shows one example of a computer program product comprising computer readable means.

FIG. 7 shows one example of a computer program product 90 comprising computer readable means. On this computer readable means, a computer program 91 can be stored, which computer program can cause a processor to execute a method according to embodiments described herein. In this example, the computer program product is in the form of a removable solid-state memory, e.g. a Universal Serial Bus (USB) drive. As explained above, the computer program product could also be embodied in a memory of a device, such as the computer program product 64 of FIG. 5. While the computer program 91 is here schematically shown as a section of the removable solid-state memory, the computer program can be stored in any way which is suitable for the computer program product, such as another type of removable solid-state memory, or an optical disc, such as a CD (compact disc), a DVD (digital versatile disc) or a Blu-Ray disc.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art.

The various aspects and embodiments disclosed herein are for purposes of illustration and are not intended to be limiting, with the true scope and spirit being indicated by the following claims.

The invention claimed is:

1. A method for adjusting a network of sensor devices, the network also comprising an aggregation node for aggregating sensor data from at least two of the sensor devices to processed data and an application node configured to approach an application goal based on the processed data, the method being performed in a network device, the method comprising:

receiving an evaluation of performance of the application node in relation to the application goal and an environment context not known by the application goal;

determining that the evaluation indicates that an adjustment is needed;

determining an operation adjustment of at least one of the aggregation node and the sensor devices, wherein the determining the operation adjustment comprises determining an adjustment action to adjust how at least one sensor device provides sensor data, and wherein the operation adjustment is stored in association with the evaluation of performance and the environment context as an element of an operation adjustment history, the operation adjustment history being used to allow learning of operation adjustment over time, by comparing with subsequent evaluations of performance and corresponding environment contexts;

creating, based on the operation-adjustment history, a feedback loop to allow the network device to further adjust the operation adjustment based on the learning; and triggering the adjustment.

2. The method according to claim 1, wherein the determining the operation adjustment comprises determining an adjustment of a processing function of the aggregation node, and wherein the processing function combines sensor data from the at least two of the sensor devices to processed data.

3. The method according to claim 1, wherein the determining the operation adjustment is performed using a machine learning engine.

4. The method according to claim 1, further comprising:

obtaining updated processed data;

wherein the determining the operation adjustment is based at least partly on the updated processed data.

5. The method according to claim 1, wherein the method is performed in an agent module executing in the network device, the agent module forming part of a multi-agent programming framework.

6. The method according to claim 5, further comprising:

transmitting the updated processed data to another agent module.

7. The method according to claim 5, wherein the agent modules are arranged hierarchically.

8. The method according to claim 1, wherein the sensor devices are telecommunication network sensors.

9. A network device for adjusting a network of sensor devices, the network also comprising an aggregation node for aggregating sensor data from at least two of the sensor devices to processed data and an application node configured to approach an application goal based on the processed data, the network device comprising:

a processor; and a memory storing instructions that, when executed by the processor, cause the network device to repeatedly perform:

receiving an evaluation of performance of the application node in relation to the application goal and an environment context not known by the application goal;

determining that the evaluation indicates that an adjustment is needed;

determining an operation adjustment of at least one of the aggregation node and the sensor devices, wherein the instructions to determine an operation adjustment comprise instructions that, when executed by the processor, cause the network device to determine an adjustment action to adjust how at least one sensor device provides sensor data, and wherein the operation adjustment is stored in association with the evaluation of performance and the environment context as an element of an operation adjustment history, the operation adjustment history being used to allow learning of operation adjustment over time, by comparing with subsequent evaluations of performance and corresponding environment contexts;

creating, based on the operation-adjustment history, a feedback loop to allow the network device to further adjust the operation adjustment based on the learning; and triggering the adjustment.

10. The network device according to claim 9, wherein the instructions to determine an operation adjustment comprise instructions that, when executed by the processor, cause the network device to determine an adjustment of a processing function of the aggregation node, wherein the processing function combines sensor data from at least two of the sensor devices to processed data.

11. The network device according to claim 9, wherein the network device comprises a machine learning engine to determine the operation adjustment.

12. The network device according to claim 9, further comprising instructions that, when executed by the processor, cause the network device to:

obtain updated processed data; and wherein the instructions to determine an operation adjustment is based at least partly on the updated processed data.

13. The network device according to claim 9, further comprising an agent module, wherein the instructions form part of the executing in the agent module, and wherein the agent module forms part of a multi-agent programming framework.

14. The network device according to claim 13, further comprising instructions that, when executed by the processor, cause the network device to:

transmit the updated processed data to another agent module.

15. The network device according to claim 13, wherein the agent modules are arranged hierarchically.

16. The network device according to claim 9, wherein the sensor devices are internet-of-things (IOT) sensors.

17. The network device according to claim 9, wherein the sensor devices are telecommunication network sensors.

18. A computer program product for adjusting a network of sensor devices, the network also comprising an aggregation node for aggregating sensor data from at least two of the sensor devices to processed data and an application node configured to approach an application goal based on the processed data, the computer program comprising a non-transitory computer readable medium storing computer program code which, when executed by at least one processor on a network device causes the network device to perform:

receiving an evaluation of performance of the application node in relation to the application goal and an environment context not known by the application goal;

determining that the evaluation indicates that an adjustment is needed;

determining an operation adjustment of at least one of the aggregation node and the sensor devices, wherein the determining the operation adjustment comprises determining an adjustment action to adjust how at least one sensor device provides sensor data, and wherein the operation adjustment is stored in association with the evaluation of performance and the environment context as an element of an operation adjustment history, the operation adjustment history being used to allow learning of operation adjustment over time, by comparing with subsequent evaluations of performance and corresponding environment contexts;

creating, based on the operation-adjustment history, a feedback loop to allow the network device to further adjust the operation adjustment based on the learning; and triggering the adjustment.

* * * * *